Patented May 19, 1936

2,040,823

UNITED STATES PATENT OFFICE 2,040,823

PRODUCTION OF TITANIUM DIOXIDE

Benjamin Wilson Allan, Baltimore, Md.

No Drawing. Application June 22, 1934,
Serial No. 731,998

10 Claims. (Cl. 23—202)

This invention relates to titanium dioxide and has particular reference to a new and novel method of producing pigmentary titanium oxide by hydrolysis of titanium salt solutions. More particularly it refers to a method of hydrolyzing such solutions by the addition thereto of a dry gel of titanium oxide, which acts to accelerate the hydrolysis.

Titanium oxide is one of the most popular of the pigments used in the paint industry, because of its chemical inertness and its exceptionally good covering power. It is ordinarily made from rutile (a native titanium oxide mineral) or from ilmenite (an iron titanate mineral). The titanium is put into solution in any desired manner, such as by fusion with an alkali or by attack of the mineral with strong sulphuric acid. The solutions are ordinarily purified by removal, to some extent, of their iron content. In order to get titanium oxide of good pigmentary properties it has been found necessary to hydrolyze the titanium oxide from fairly acid solutions, rather than to precipitate the oxide with alkaline materials.

The most economical method for the production of titanium oxide is to start with the mineral ilmenite and attack the mineral with hot concentrated sulphuric acid, generally using sufficient sulphuric acid to form normal salts with all of the iron and titanium present. The attack mass is then leached with water or with weak sulphuric acid, recovered later in the process, the resulting solution containing titanium and iron sulphates with some free acid. In some cases it is advantageous to use smaller percentages of sulphuric acid, in which case the titanium is present as a compound between $TiOSO_4$ and $Ti(SO_4)_2$. The amount of sulphuric acid in the solution is expressed as factor of acidity (F. A.), $TiOSO_4$ representing zero factor of acidity and $Ti(SO_4)_2$ representing 100% F. A.

The sulphate solutions are then reduced so that the iron is present in the ferrous condition, so that iron will not precipitate upon hydrolysis of the solutions. Suspended matter is ordinarily removed by filtration or other form of clarification and the solution is then ready for hydrolysis.

Some solutions are hydrolyzable by mere boiling, but solutions made by treatment of ilmenite with acid in the manner above described, produce rather poor yields of titanium oxide on simple boiling. This difference in solutions I attribute to the form of the titanium oxide before solution. Where solutions are made from ortho titanic acid or where ortho titanic acid has been formed and redissolved, hydrolysis is a simple process; where the titanium oxide is dissolved from other modifications, the process of hydrolysis becomes more difficult. The difference is probably due to the fact that ortho titanic acid goes into colloidal rather than into true solution.

Various investigators have suggested different methods of producing solutions which are readily hydrolyzable, in every case adding to the solution some titanium oxide which has been precipitated in the form of ortho titanic acid, or which goes into colloidal rather than true solution. In some cases the precipitate is formed in the solution and later dissolved, the hydrolysis being one continuous operation. In other cases a titanium oxide seeding agent is prepared on the outside and thereafter added to the solution. These seeding agents have required careful preparation and handling.

I have discovered that an excellent hydrolysis can be obtained by the use of a dry gel of titanium oxide, made in any manner well known to the art. For example, I may take a solution of titanium sulphate and prepare a gel from it by neutralizing the sulphuric acid present with an alkaline material. As the alkaline solution is added to the titanium solution a precipitate is thrown down. As the addition is continued the precipitate is for the greater part redissolved, the solution becoming more viscous. After eighty or ninety percent of the alkali has been added, the viscosity drops but it shortly begins to increase in viscosity until at the end of the reaction the solution is a thick gel which can be stirred only with difficulty. On cooling the mass becomes a dry gel.

As a specific example of the formation of this gel, I took 100 ccs. of titanic sulphate solution containing 201 grams of $TiO_2$, 437 grams of $H_2SO_4$ and 46 grams of Fe per liter, and neutralized all of the acid except that combined with the iron with a solution of caustic soda (800 grams per liter concentration). The temperature rose gradually as described in the preceding paragraph until on the addition of the last ten percent of the caustic a violent reaction set in and the whole solution boiled and frothed while the temperature rose to 108° C. The dry gel formed contained 6.56% $TiO_2$.

These dry titanium oxide gels may be added to solutions of titanium salts which are not in themselves hydrolizable to produce rapid and complete hydrolysis. For example, a solution was made up by reacting on ilmenite with hot concentrated sulphuric acid, reducing the iron to a ferrous condition. The clarified solution contained 201 grams per liter of titanium oxide at a factor of acidity of 43 with 46.0 grams of Fe per liter. To 100 ccs. of this solution one gram of dry gel obtained as above was added and the solution heated to boiling. At the end of two hours a ninety-six percent recovery was obtained. When the hydrolysis was carried out without the addition of the gel, such complete recovery was not obtainable in an economic period, the recovery being about sixty percent after six hours' boiling.

In another experiment a solution obtained by attacking ilmenite, containing 124.7 grams per liter of titanium oxide at a factor of acidity of 139 with 102 grams of Fe per liter, was hydrolyzed after the addition of one quarter gram of gel (2% of the titanium oxide in the solution). A ninety-four percent recovery was obtained after one hour. Recovery on the unseeded solution was about fifty percent after six hours.

The gels are insoluble in both cold and hot water and may be washed free of soluble iron salts and sodium sulphate. Either the washed or the unwashed gel may be used, and give substantially the same results.

Gels may be formed not only by neutralization of the titanium sulphate with caustic soda, but any alkali or alkali earth hydroxide, carbonate or sulphide will produce workable gels, and I may use any other titanic salt, such as the chloride, as the source of my titanium. Where alkali earths are used with titanium sulphate, the alkali earth sulphate remains with the gel as a diluent. Gels may likewise be made from alkali or alkali earth titanates by adding the necessary amount of acid.

The principal advantage of my seed lies in the easy hydrolysis obtainable, and the small amounts of seed necessary. Only 2 grams of gel (containing less than 10% $TiO_2$) is needed to hydrolyze 100 grams of $TiO_2$ from solution, where with other seeds 10 to 20 grams may be needed.

My gel seed likewise has the advantage over seeds previously used in that no special precautions need be taken about the manufacture or storage of the seed as it is a powdery material; and in the fact that very rapid hydrolyses are obtained.

I claim:

1. The method of accelerating hydrolysis of titanium salt solutions which comprises adding thereto a gel of titanium oxide.

2. The method of accelerating the hydrolysis of titanium salt solutions which comprises heating the solutions in the presence of a gel of titanium oxide.

3. The method of accelerating the hydrolysis of titanium sulphate solutions which comprise heating the solution in the presence of a gel of titanium oxide.

4. The method of accelerating the hydrolysis of titanium salt solutions which comprises heating the solutions in the presence of a dry gel of titanium oxide.

5. The method of accelerating the hydrolysis of titanium sulphate solutions which comprises heating the solution in the presence of a gel of titanium oxide prepared by neutralizing a titanium salt solution with an alkaline reacting compound.

6. The method of accelerating the hydrolysis of titanium sulphate solutions which comprises heating the solution in the presence of a gel of titanium oxide prepared by neutralizing a titanium salt solution with an alkali.

7. The method of accelerating the hydrolysis of titanium sulphate solutions which comprises heating the solution in the presence of a gel of titanium oxide prepared by neutralizing a titanium salt solution with caustic soda.

8. A seeding agent for accelerating the hydrolysis of titanium salt solutions comprising a gel of titanium oxide prepared by adding to a solution containing titanium, other metal and sulphate ions just sufficient caustic soda to combine with all the sulphate present as free acid and combined with titanium, whereby a dry gel is formed.

9. The method of accelerating the hydrolysis of titanium salt solutions comprising heating the solution in the presence of a gel of titanium oxide prepared by adding to a solution containing titanium, other metal and sulphate ions just sufficient caustic soda to combine with all the sulphate present as free acid and combined with titanium, whereby a dry gel is formed.

10. The method of accelerating the hydrolysis of titanium sulphate solutions which comprises heating the solution in the presence of a dry gel of titanium oxide.

BENJAMIN WILSON ALLAN.